(12) United States Patent
Rosenberg et al.

(10) Patent No.: US 10,795,091 B2
(45) Date of Patent: Oct. 6, 2020

(54) ADAPTOR FOR OPTICAL COMPONENT OF OPTICAL CONNECTOR

(71) Applicant: HEWLETT PACKARD ENTERPRISE DEVELOPMENT LP, Houston, TX (US)

(72) Inventors: Paul Kessler Rosenberg, Palo Alto, CA (US); Sagi Mathai, Palo Alto, CA (US); Michael Tan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/650,197

(22) Filed: Jul. 14, 2017

(65) Prior Publication Data

US 2019/0018203 A1     Jan. 17, 2019

(51) Int. Cl.
  *G02B 6/36*   (2006.01)
  *G02B 6/38*   (2006.01)
  *G02B 6/42*   (2006.01)

(52) U.S. Cl.
  CPC ......... *G02B 6/3834* (2013.01); *G02B 6/3825* (2013.01); *G02B 6/3826* (2013.01); *G02B 6/423* (2013.01); *G02B 6/4214* (2013.01); *G02B 6/4292* (2013.01); *G02B 6/4215* (2013.01)

(58) Field of Classification Search
  USPC .................................... 385/14, 33, 134–135
  See application file for complete search history.

(56) References Cited

U.S. PATENT DOCUMENTS

| 5,671,311 | A | | 9/1997 | Stillie et al. |
| 5,727,104 | A | * | 3/1998 | Sasaki ................... G02B 6/423 385/92 |
| 5,732,175 | A | | 3/1998 | Fan |

(Continued)

FOREIGN PATENT DOCUMENTS

| CN | 100472258 C | 3/2009 |
| EP | 1182478 | 2/2002 |

(Continued)

OTHER PUBLICATIONS

Delta Electronics, Inc., "Small Form Factor Bi-directional Transceiver Module for Gigabit Ethernet," SFBD-1250A4K1RS, Sep. 1, 2009, pp. 1-9, Revision: S3.

(Continued)

*Primary Examiner* — Eric Wong
(74) *Attorney, Agent, or Firm* — Hewlett Packard Enterprise Patent Department

(57) ABSTRACT

An example adaptor for passively aligning an optical component of an optical connector with a ferrule of the optical connector. The adaptor may include first alignment feature and second alignment features. The first alignment features may be to, when the adaptor is connected to the ferrule, cooperate with alignment features of the ferrule to passively force the adaptor into a first configuration relative to the ferrule. The second alignment features may be arranged such that, when the optical component is held in contact with the second alignment features and the adaptor is in the first configuration relative to the ferrule, the optical component is in an aligned position relative to the ferrule.

16 Claims, 10 Drawing Sheets

(56) References Cited

U.S. PATENT DOCUMENTS

| | | | |
|---|---|---|---|
| 5,781,682 A * | 7/1998 | Cohen | G02B 6/4277 385/89 |
| 6,019,519 A | 2/2000 | Grinderslev et al. | |
| 6,198,864 B1 | 3/2001 | Lemoff et al. | |
| 6,209,928 B1 | 4/2001 | Benett | |
| 6,250,818 B1 | 6/2001 | Loughlin et al. | |
| 6,540,414 B1 * | 4/2003 | Brezina | G02B 6/421 264/1.1 |
| 6,682,230 B1 | 1/2004 | Demangone | |
| 6,815,729 B1 | 11/2004 | Brophy et al. | |
| 6,861,641 B1 | 3/2005 | Adams | |
| 6,863,450 B2 | 3/2005 | Miazotti et al. | |
| 6,890,107 B1 | 5/2005 | Brophy et al. | |
| 7,076,144 B2 | 7/2006 | Loder et al. | |
| 7,129,722 B1 | 10/2006 | Brophy et al. | |
| 7,281,856 B2 | 10/2007 | Grzegorzewska et al. | |
| 7,281,862 B2 | 10/2007 | Oen et al. | |
| 7,329,054 B1 | 2/2008 | Epitaux et al. | |
| 8,277,128 B2 | 10/2012 | Hackett | |
| 8,398,421 B2 | 3/2013 | Haberek et al. | |
| 8,591,244 B2 | 11/2013 | Thomas et al. | |
| 8,932,084 B2 | 1/2015 | Thackston et al. | |
| 9,235,019 B2 | 1/2016 | Shastri et al. | |
| 9,325,445 B2 | 4/2016 | Khor et al. | |
| 9,470,858 B2 | 10/2016 | Houbertz-Krauss et al. | |
| 9,651,745 B2 | 5/2017 | Chou et al. | |
| 9,927,581 B1 | 3/2018 | Rosson et al. | |
| 10,330,872 B2 | 6/2019 | Rosenberg et al. | |
| 2002/0172469 A1 | 11/2002 | Benner | |
| 2003/0201462 A1 | 10/2003 | Pommer et al. | |
| 2004/0109649 A1 | 6/2004 | Mazotti et al. | |
| 2006/0088248 A1 | 4/2006 | Tran | |
| 2007/0297713 A1 | 12/2007 | Lu et al. | |
| 2009/0003826 A1 * | 1/2009 | Jeon | G02B 6/4246 398/43 |
| 2010/0054671 A1 | 3/2010 | Ban et al. | |
| 2011/0108716 A1 | 5/2011 | Shiraishi | |
| 2011/0111624 A1 | 5/2011 | Ball | |
| 2011/0268397 A1 * | 11/2011 | Meadowcroft | G02B 6/4214 385/94 |
| 2011/0280523 A1 | 11/2011 | Yeh et al. | |
| 2012/0014639 A1 | 1/2012 | Doany et al. | |
| 2012/0027345 A1 * | 2/2012 | Castagna | G02B 6/4292 385/33 |
| 2012/0121218 A1 * | 5/2012 | Kim | G02B 6/3885 385/14 |
| 2012/0163811 A1 | 6/2012 | Doany et al. | |
| 2013/0209040 A1 | 8/2013 | Graham et al. | |
| 2013/0216190 A1 | 8/2013 | Haley et al. | |
| 2013/0266255 A1 | 10/2013 | Tan et al. | |
| 2013/0272649 A1 | 10/2013 | Braunisch et al. | |
| 2014/0049292 A1 | 2/2014 | Popescu et al. | |
| 2014/0061452 A1 | 3/2014 | Schade | |
| 2014/0105549 A1 | 4/2014 | Kohnishi | |
| 2014/0154914 A1 | 6/2014 | Schneider | |
| 2014/0179129 A1 | 6/2014 | Chan et al. | |
| 2014/0334778 A1 | 11/2014 | Walker et al. | |
| 2015/0063760 A1 * | 3/2015 | Pommer | G02B 6/4251 385/79 |
| 2015/0079815 A1 | 3/2015 | Leigh et al. | |
| 2015/0131940 A1 | 5/2015 | Rosenberg et al. | |
| 2015/0277067 A1 | 10/2015 | Droesbeke | |
| 2015/0301293 A1 | 10/2015 | Seetharam et al. | |
| 2015/0325527 A1 | 11/2015 | Rosenberg et al. | |
| 2016/0116695 A1 | 4/2016 | Nekado et al. | |
| 2016/0195677 A1 | 7/2016 | Panotopoulos et al. | |
| 2016/0209610 A1 | 7/2016 | Kurtz et al. | |
| 2017/0131492 A1 * | 5/2017 | Vallance | G02B 6/4251 |
| 2017/0341972 A1 | 11/2017 | Bookbinder et al. | |
| 2018/0217335 A1 | 8/2018 | Leeson et al. | |
| 2019/0018203 A1 | 1/2019 | Rosenberg et al. | |
| 2019/0074617 A1 | 3/2019 | Rosenberg et al. | |
| 2019/0146167 A1 | 5/2019 | Leigh et al. | |
| 2019/0157783 A1 | 5/2019 | Leigh et al. | |

FOREIGN PATENT DOCUMENTS

| | | |
|---|---|---|
| EP | 1315991 | 6/2003 |
| WO | WO-9400785 | 1/1994 |
| WO | WO-20111008041 A2 | 1/2011 |
| WO | WO-2014021231 | 2/2014 |
| WO | WO-2014068357 | 5/2014 |

OTHER PUBLICATIONS

Chuang, S. et al., "Development and Qualification of a Mechanical-optical Interface for Parallel Optics Links," (Research Paper), Feb. 11, 2015, 8 pages, available at http://www.usconec.com/LiteratureRetrieve.aspx?ID=222018.

Neutrik; "opticalCON" (Web Page), Feb. 18, 2014, 40 pages, available at https://www.fclane.com/sites/default/files/Product%20Folder%20opticalCON.pdf.

Rosenbeg, P. K., et al.; "U.S. Non-Final Office Action cited in U.S. Appl. No. 15/283,181" dated Dec. 21, 2018; 13 pages.

Rosenberg, P. K.; "Office Action 3mo." dated Nov. 2, 2018; 15 pages.

International Search Report and Written Opinion received for PCT Patent Application No. PCT/US2015/062334, dated Aug. 22, 2016, 10 pages.

European Search Report and Search Opinion Received for EP Application No. 16891836.5, dated Oct. 22, 2018, 8 pages.

European Search Report and Search Opinion Received for EP Application No. 15909401.0, dated Oct. 25, 2018, 7 pages.

* cited by examiner

ADAPTOR FOR OPTICAL COMPONENT OF OPTICAL CONNECTOR

BACKGROUND

Optical signals may be used for high speed data communication. Optical signals may be carried between communicating devices via optical fiber cables.

DETAILED DESCRIPTION

Figure 1:
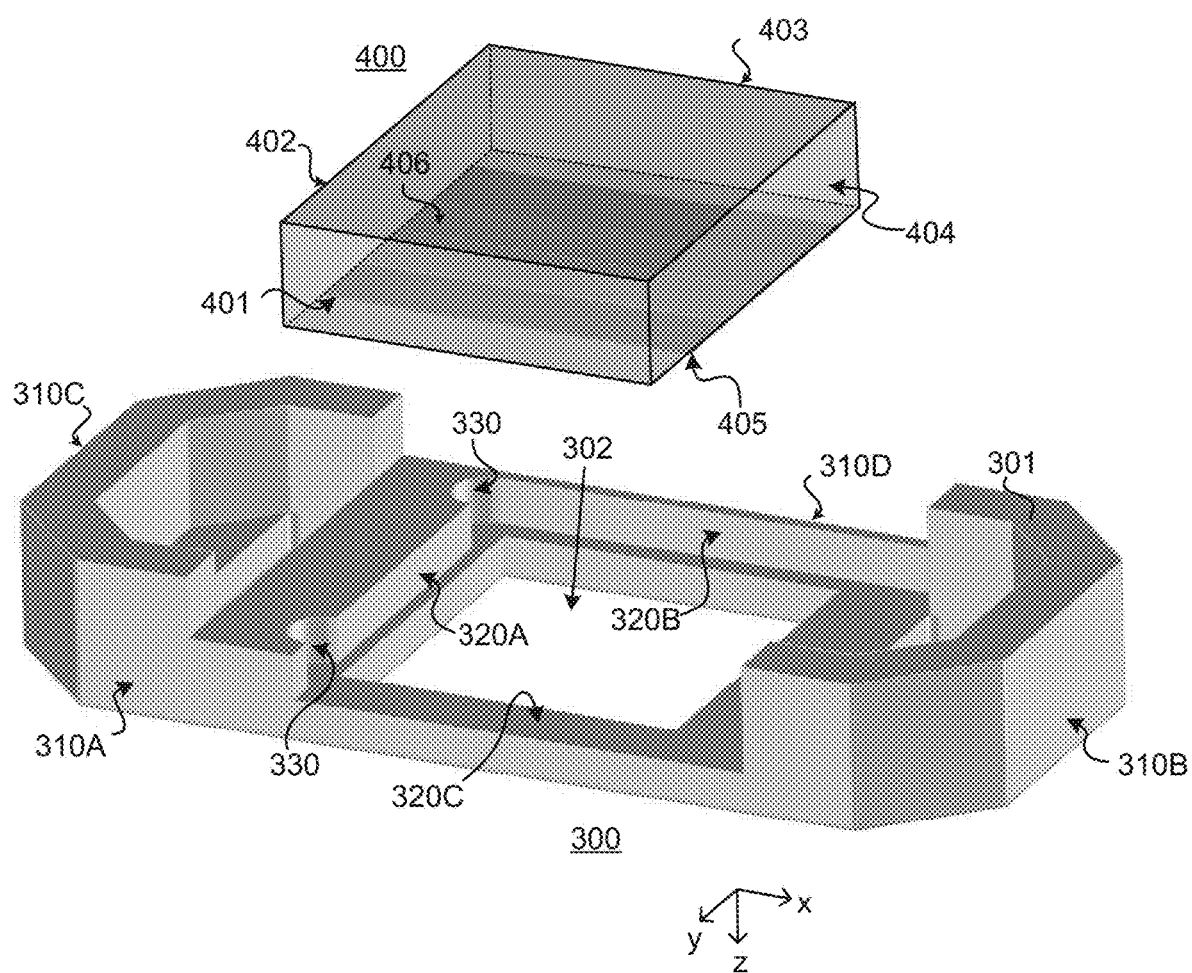
FIG. 1 illustrates a perspective view of an example adaptor and an example optical component of the adaptor, the adaptor and component being in a disconnected state.

An optical fiber cable may have an optical connector at an end thereof to connect the optical fiber cable to an optical interface of a communicating device. The optical interface may transmit optical signals to and/or receive optical signals from the optical fiber cable. In particular, an optical interface may include an electro-optical subassembly that may convert optical signals received from the cables into electrical signals and/or convert electrical signals into optical signals that are transmitted to the cables. For example, an electro-optical subassembly may include active optical devices that generate and/or detect light (such as LEDs, lasers, photo-diodes, etc.), application specific integrated circuits (ASICs), and other electronic elements, which may be formed or assembled on a printed circuit board (PCB). An optical interface may also include an optical socket to which an optical connector of an optical fiber cable may be physically connected. The connector of the optical fiber cable and the optical socket of the optical interface may have complementary alignment structures that are precisely arranged such that, when connected to one another, the optical socket holds the optical connector in alignment relative to the optical devices of the electro-optical subassembly, thereby allowing optical signals to be communicated between the optical devices and the cable.

An optical connector for an optical fiber cable may include a ferrule (e.g., ferrule 200), in which the optical fibers of the optical fiber cable are terminated. The ferrule may be designed to mate with the optical socket of an optical interface so as to align the ferrule relative to the optical interface. The ferrule may guide optical signals that are emitted from the optical fibers and/or optical signals that are emitted from the optical interface along optical paths through the ferrule such that, when the optical connector and the optical interface are aligned, optical signals may be communicated between the optical fibers and the optical interface.

An optical connector may also include an optical component (e.g., optical component 400) that is connected to the ferrule and interposed in the optical paths such that the optical signals impinge on and/or pass through the optical component as they are communicated between the optical fibers and the active optical devices of the electro-optical subassembly. The optical component may perform some desired operation on the optical signals, such as filtering, focusing, reflecting, polarizing, etc. For example, the optical component may be a filter, a lens, a micro-lens array, a polarizer, a prism, a beam-splitter, a mirror, etc.

In general, the optical component and the ferrule of an optical connector should be aligned precisely relative to one another. One reason for this is that misalignment of the optical component and the ferrule may change the optical paths of the optical signals, which may result in optical signals from the optical fibers failing to reach their intended active optical device and vice versa. Thus, in certain examples a ferrule may be designed to automatically (passively) align an optical component relative to the ferrule when the optical component is connected thereto. For example, the ferrule may include alignment features (e.g., alignment features 210) that are to engage with an optical component as the optical component is connected to the ferrule and guide the active optical component into an aligned state. In particular, a ferrule may be designed to passively align a specific size and shape of optical component (or a specific range of sizes/shapes), which may be referred to hereinafter as the "reference size/shape" for the ferrule, and the alignment features of the ferrule may be precisely arranged based on the reference size/shape such that the alignment features are capable of properly engaging with complementary features of an optical component that has the reference size/shape so as to passively align the component.

In certain circumstances it may be desirable to use an optical component that has smaller dimensions than the reference size/shape of the ferrule to which it is to be connected. Because such optical components are smaller than the reference size/shape of the ferrule, the ferrule may not be able to passively align the optical components. For example, if proper alignment requires a precision of ±ε, then the ferrule may not be able to passively align an optical component that has a dimension that is more than c smaller than the corresponding dimension of the reference size/shape.

Thus, certain example optical connectors described herein may include an adaptor (e.g., adaptor 300) that is to facilitate using optical components that have smaller dimensions than the reference size/shape of the ferrule to which they are to be connected. In such examples, the optical component may be connected to the adaptor (see, e.g., FIGS. 2A-3C), and the adaptor may be connected to the ferrule (see, e.g., FIGS. 4A-B). The adaptor may include first alignment features (e.g., first alignment features 310) to interact with alignment features of the ferrule when the adaptor is connected to the ferrule so as to precisely fix the spatial configuration of the adaptor relative to the ferrule. The adaptor may also include second alignment features (e.g., second alignment features 320) by which the spatial configuration of the optical component may be precisely fixed relative to the adaptor. Thus, when the optical component is connected to the adaptor and the adaptor is connected to the ferrule, the optical component may be precisely passively aligned relative to the ferrule.

For example, the adaptor may include second alignment features that are consistent with the reference size/shape of the ferrule, such that the second alignment features of the adaptor may interact with the alignment features of the ferrule in a fashion similar to how an optical component of the reference size/shape would interact with the alignment features of the ferrule. Thus, the ferrule is capable of passively aligning the adaptor relative to the ferrule in the same way that the ferrule would passively align an optical component of the reference size/shape.

Thus, the adaptor may allow an optical component to be used that is smaller than the reference size/shape of the ferrule, while still allowing for the ferrule to passively align the optical component. This may be beneficial, for example, because it may allow optical cables that are not intended to use the full capacity of a reference size/shape optical component to have a smaller optical component used instead, which may substantially reduce the cost of the cable. For example, some optical cables may be designed to use fewer active optical fibers (i.e., fewer lanes) than a maximum capacity of lanes, and for such cables an optical component that is smaller than the reference size/shape may be sufficient. Using a smaller optical component in an optical cable may substantially reduce the cost of the cable because the cost of the optical component may represent a significant proportion of the total cost of the cable, and the cost of the optical component is based on its size.

Moreover, the adaptor may allow different sizes of optical components to be used with the same type of ferrule (i.e., without having to use a different sized ferrule to fit the different sizes of optical components). This may be beneficial, for example, in that having a single ferrule design may reduce costs and complexity in manufacturing of the optical cables. For example, optical cables designed with different numbers of lanes may be manufactured using the same type of ferrule.

For example, by using one of the example adaptors described herein, a single type of ferrule could be used to manufacture a 16× optical cable (16 lanes), an 8× optical cable (8 lanes), and a 4× optical cable (4 lanes), with all of these cables having different sizes of optical components sized according to the number of lanes the cable is intended to use. In particular, an example 16× optical cable might be manufactured using a reference size/shape optical component that is designed to handle 16 lanes (hereinafter, a "16× optical component") and a ferrule that is sized to fit the 16× optical component (hereinafter a "16× ferrule"); an example 8× optical cable might be manufactured using the same 16× ferrule together with an example adaptor connected to an example optical component that is approximately one-half the size of the 16× optical component; and an example 4× optical cable might be manufactured using the same 16× ferrule together with an example adaptor connected to an example optical component that is approximately one-fourth the size of the 16× optical component. In such an example, the 4× cable may cost substantially less to manufacture than the 8× cable, and the 8× cable may cost substantially less to manufacture than the 16× cable. Moreover, in such an example the same ferrule design is used, and yet the optical components in all of the 4×, 8×, and 16× cables are still able to be passively aligned relative to the ferrule, as a result of using the adaptor.

In addition, by allowing multiple sizes of optical components to be used with the same ferrule, the adaptor may enable changing the size of the optical component of an optical cable after its manufacture. For example, an 8× optical cable might be upgraded after manufacture to be a 16× optical cable by removing the 8× optical component and adaptor and connecting a larger 16× optical component to the ferrule; such a change might not be possible if different sized ferrules were used for different sized optical components, as the ferrule of the 8× optical cable would not fit the 16× optical component. [Example Adaptors, Optical Components, and Assemblies]

Figure 2A:
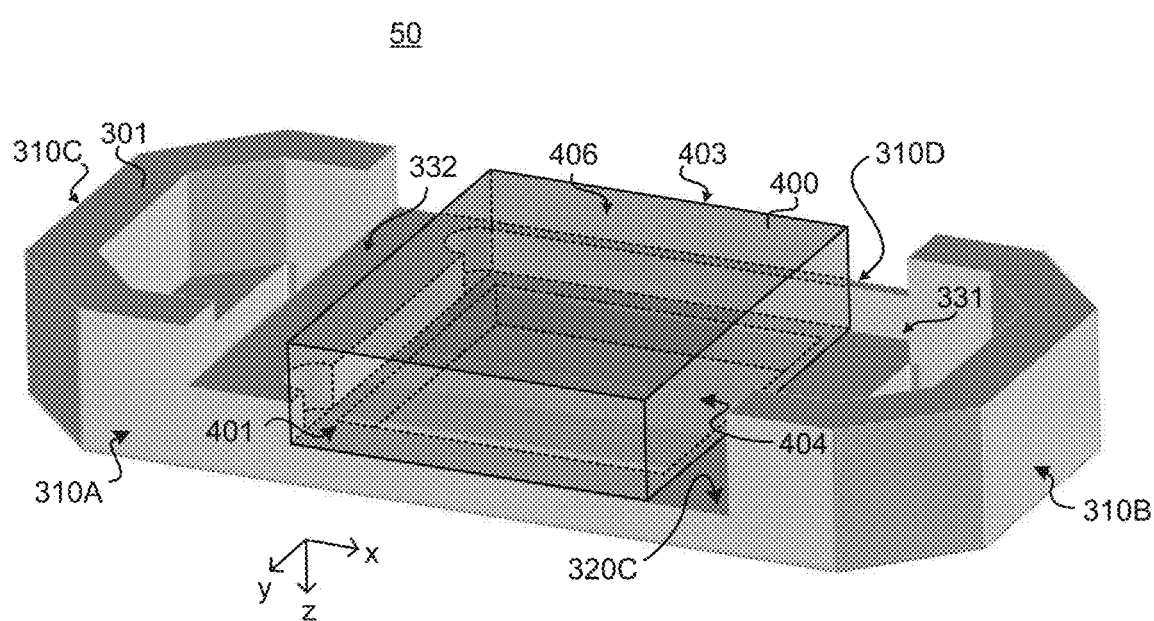
FIG. 2A illustrates a perspective view of an example assembly comprising an example adaptor connected to an example optical component.
Figure 2B:
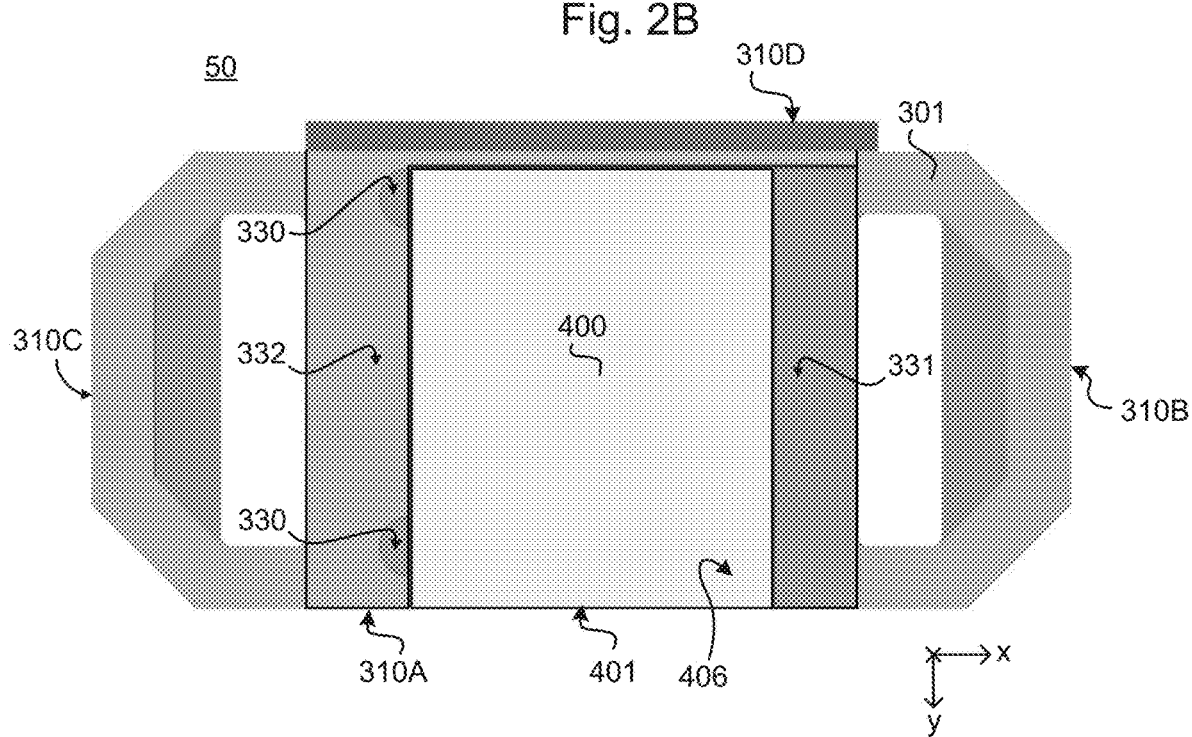
FIG. 2B illustrates a plan view of an example assembly comprising an example adaptor connected to an example optical component.
Figure 3A:
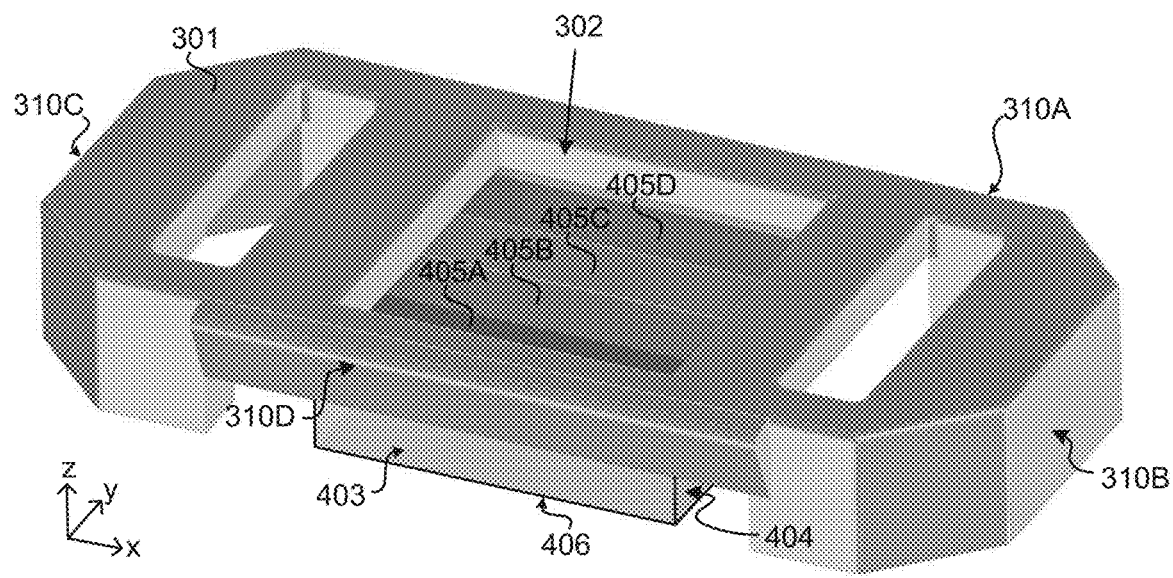
FIG. 3A illustrates another perspective view of an example assembly comprising an example adaptor connected to an example optical component.
Figure 3B:
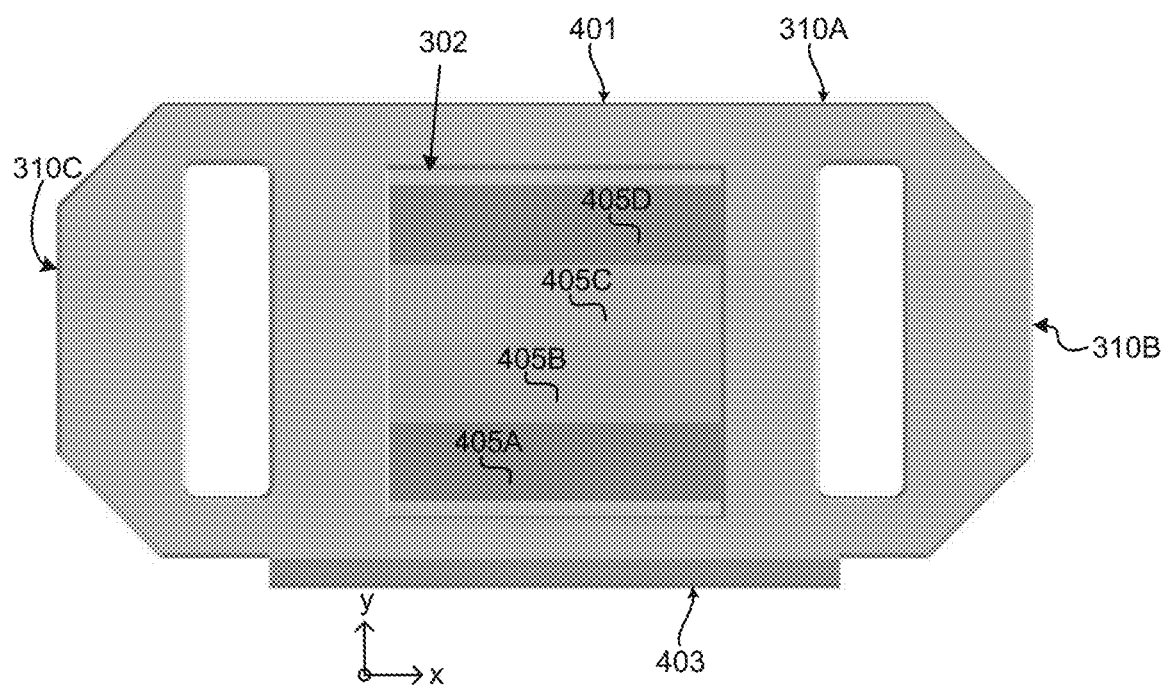
FIG. 3B illustrates another plan view of an example assembly comprising an example adaptor connected to an example optical component.
Figure 3C:
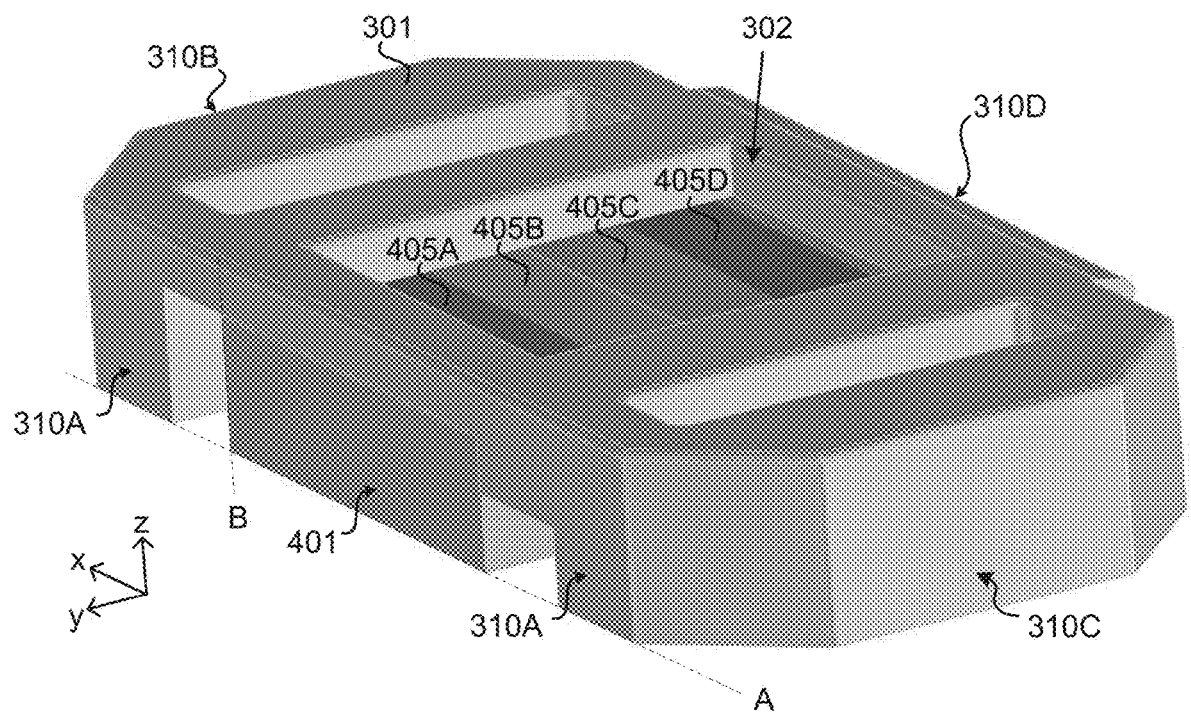
FIG. 3C illustrates another perspective view of an example assembly comprising an example adaptor connected to an example optical component.

FIGS. 1-3C illustrate various views of an example adaptor 300 and an example optical component 400, as well as an example assembly 50 formed by connecting the example adaptor 300 and the example optical component 400. FIG. 1 illustrates a perspective view from a −z side of the adaptor 300 in which the optical component 400 is shown disconnected from the adaptor 300. In all of the other Figures the optical component 400 is shown connected to the adaptor 300, forming an example assembly 50. FIG. 2A illustrates a perspective view from a −z side of the adaptor 300. FIG. 2B illustrates a plan view from a −z side of the adaptor 300 (i.e., a bottom up view). FIG. 3A illustrates a perspective view from a +z side of the adaptor 300. FIG. 3B illustrates a plan view from a +z side of the adaptor 300 (i.e., a top down view). FIG. 3C illustrates another perspective view from a +z side of the adaptor 300.

The example adaptor 300 comprises a body 301, first alignment features 310, second alignment features 320, an aperture 302, and cavities 330. The body 301 may be formed as an integrated piece, for example via injection molding, or may be formed by joining multiple pieces together. The body 301 may be formed from any solid material(s), such as plastic, glass, metal, etc. In the example illustrated in the Figures, the adaptor 300 is not transparent, and hence has the aperture 302 to allow the optical signals to pass through the adaptor 300. However, in other examples the adaptor 300 could be transparent, in which case the aperture 302 could be omitted if desired.

The first alignment features 310 may be any structures that are configured such that they can cooperate with corresponding alignment features 210 of the ferrule 200 when the adaptor 300 is connected to the ferrule so as to passively align the adaptor 300 relative to the ferrule 200. For example, the alignment features 310 and 210 may cooperate with one another so as to constrain lateral (x-y) motion and rotation of the adaptor 300 relative to the ferrule 200. For example, the first alignment features 310 may be formed by surfaces of the body 301 that are to cooperate with complementary surfaces of the ferrule that form the alignment features 210. For example, in FIGS. 1-3C the first alignment features 310A-C are formed by exterior facing surfaces of the font and side walls of the body 301, while the first alignment feature 310D is formed by a surface of an angled protrusion from a rear wall of the body 301. In the example of FIGS. 1-3C, the first alignment features 310A cooperate with the alignment features 210A, the first alignment features 310B cooperate with the alignment features 210B, and so on.

The first alignment features 310 may be arranged based on the reference size/shape of the ferrule 200 to which the adaptor 300 is to be connected. In particular, the first alignment features 310 may adopt similar dimensions as those of the reference size/shape, and may be located on the adaptor 300 at locations that will enable them to engage with their corresponding alignment features 210. For example, if the reference size/shape is a cuboid that has x- and y-dimensions of Q×P, then the first alignment features 310 may adopt similar dimensions—for example, outward facing surfaces of the first alignment features 310C and 310D may be spaced a distance of Q apart from one another and outward facing surfaces of the first alignment features 310A and 310D may be spaced a distance of P apart from one another. While the exterior shape of the adaptor 300 may be similar to the exterior shape of the reference size/shape, this need not necessarily be the case.

Although some of the first alignment features 310 are illustrated in the Figures as being flat surfaces, this is merely one example and the first alignment features 310 could have other shapes. In particular, the first alignment features 310 may have any shapes that, in conjunction with the alignment features 210, allow for passive alignment of the adaptor 300. For example, the first alignment features 310 may be formed by flat surfaces, curved surfaces, irregular surfaces, etc. In addition, although some of the first alignment features 310 are illustrated in the Figures as corresponding to side walls of the adaptor 300, this is merely one example and the alignment features could be otherwise. For example, the first alignment features 310 may be formed by protrusions from the side walls, depressions or holes in the side walls, etc. Furthermore, the number of first alignment features 310 that are used is not limited to that shown in the example.

The second alignment features 320 may be any structures that are configured such that, when the optical component 400 is in contact with all of the second alignment features 320, the optical component 400 is in an aligned position relative to the adaptor 300. In addition, in certain examples, the second alignment features 320 may be such that they may passively align the optical component 400 relative to the adaptor 300 when the optical component 400 is connected to the adaptor 300 and a force is applied to the optical component 400 in a predetermined direction relative to the adaptor 300. In FIGS. 2A-3C, the optical component 400 is illustrated in the aligned position relative to the adaptor 300.

For example, in FIGS. 1-3C the second alignment features 320 are configured to constrain motion of the optical component 400 relative to the adaptor 300 in a −x direction, a −y direction, and a +z direction. In such an example, when the optical component 400 is connected to the adaptor 300 and a force is applied to the optical component 400 in a direction of $-\hat{x}-\hat{y}+\hat{z}$, the second alignment features 320 guide the optical component 400 such that it is passively aligned relative to the adaptor 300. More specifically, in FIGS. 1-3C the second alignment features 320A-320B comprise three surfaces of the body 301 that define a recess in an underside of the body 301, with the second alignment feature 320A constraining motion of the optical component 400 in the −x direction, the second alignment feature 320B constraining motion of the optical component 400 in the −y direction, and the second alignment feature 320C constraining motion of the optical component 400 in the +z direction. In this example, motion in the +y and +x directions is not directly constrained by the second alignment features 320, and instead may be constrained, for example, by adhesive that is applied to affix the optical component 400 to the adaptor 300.

In certain examples, when the optical component 400 is in the aligned position relative to the adaptor 300, a reference surface of the optical component 400 is aligned with one of the first alignment features 310. The reference surface being aligned with one of the first alignment features 310 means that the reference surface and the first alignment feature 310 are both flush with (if flat surfaces) or tangent to (if non-flat surfaces) a same plane that is parallel to the x-z plane or the y-z plane. In examples in which both the reference surface and the one of the first alignment features 310 are flat surfaces, the reference surface being aligned with the one of the first alignment features 310 means that both the reference surface and the first alignment feature 310 are flush with the same plane, which is parallel to the x-z plane or y-z plane. For example as illustrated in FIGS. 2A, 2B, and 3C, both the face 401 of the optical component 400 and the first alignment feature 310A are flush with the same plane which is parallel to the x-z (e.g., see the plane in FIG. 3C that is defined by the intersection of the dashed lines A and B). Furthermore, in certain examples, when the optical component 400 is in the aligned position relative to the adaptor 300, the optical component 400 is centered in at least one lateral direction (e.g., the x direction) relative to the adaptor 300.

Although the second alignment features 320 illustrated in FIGS. 1-3C do not constrain motion of the optical component 400 relative to the adaptor 300 in the +y direction or in the +x direction, this need not necessarily be the case. For example, rather than leaving a gap in the region 331, an additional second alignment feature 320D may be provided opposite the second alignment feature 320A to constrain motion in the +x direction.

The example optical component 400 may be, for example, a multi-wavelength spectral filter. In such an example, the optical component 400 may be formed, for example, by a piece of glass, sapphire, or other transparent (translucent) material which is approximately a cuboid in shape, with surfaces 401-406. The surface 401 may serve as a reference surface that defines alignment of the optical component 400 along the y-direction. The surfaces 402, 403, and 405 may contact the second alignment features 320A, 320B, and 320C, respectively, of the adaptor 300 when the optical component 400 is connected thereto (see, for example, FIGS. 2A-B). The surface 406 may face the ferrule 200 when the assembly 50 is connected to the ferrule 200 (see, for example, FIGS. 4A & 4C), while the surface 405 may face the active optical devices 520 of the optical interface 500 when the connector 100 is connected to the optical interface 500 (see, for example, FIGS. 5 and 6). In certain examples, the optical component may have multiple different filtering regions (e.g., regions 405A-405D) that each correspond to a different wavelength (more specifically, a range of wavelengths). For example, the optical component 400 may include surface coatings in the different wavelength regions 405A-405D that each are to pass a different wavelength range and reflect other wavelengths. The optical component 400, in combination with the ferrule 200, may form a Coarse Wave Division Multiplexing (CWDM) optical multiplexor/demultiplexor (Mux/Demux).

In other examples (not illustrated), the optical component 400 could be, for example a lens, a micro-lens array, a polarizer, a prism, a beamsplitter, etc. In particular, the optical component 400 could be any optical component that is to be interposed in the optical paths. The optical component 400 may perform some desired operation on the optical signals, such as filtering, focusing, reflecting, etc.

As noted above, in FIGS. 2A-3C, the optical component 400 is connected to the adaptor 300, thereby forming an assembly 50. In certain examples, the optical component 400 may be connected with the adaptor 300 by placing the optical component 400 in proximity to the second alignment features 320, applying a force to the optical component 400 so as to push the optical component 400 into a position in which it is contacting all of the second alignment features 320 (e.g., apply a force generally along the direction $-\hat{x}-\hat{y}+\hat{z}$), and then affixing their positions by mechanical and/or chemical fasteners (e.g., applying adhesive to the optical component 400 and the adaptor 300). For example, adhesive may be applied in the recesses 330, and/or in the region 331, and/or in the region 332. Thus, the optical component 400 is initially passively aligned by the second alignment features 320 and the applied force, and then after the force is removed the optical component 400 is held in the aligned position by the fasteners.

[Example Optical Connectors and Optical Cables]

Figure 4A:
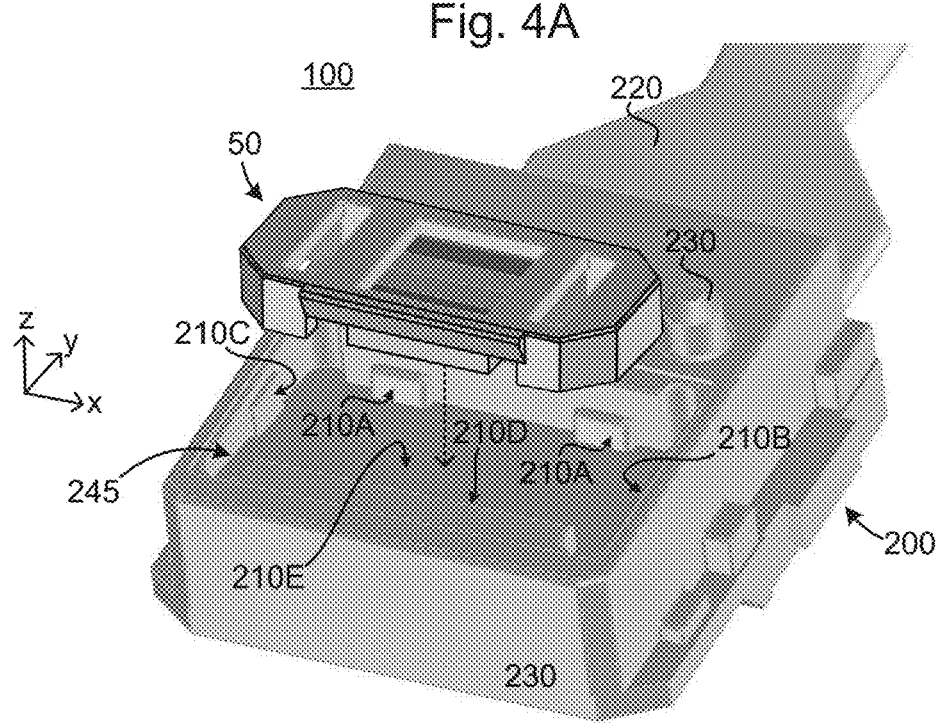
FIG. 4A illustrates a perspective view of an example assembly and an example ferrule in a disconnected state.
Figure 4B:
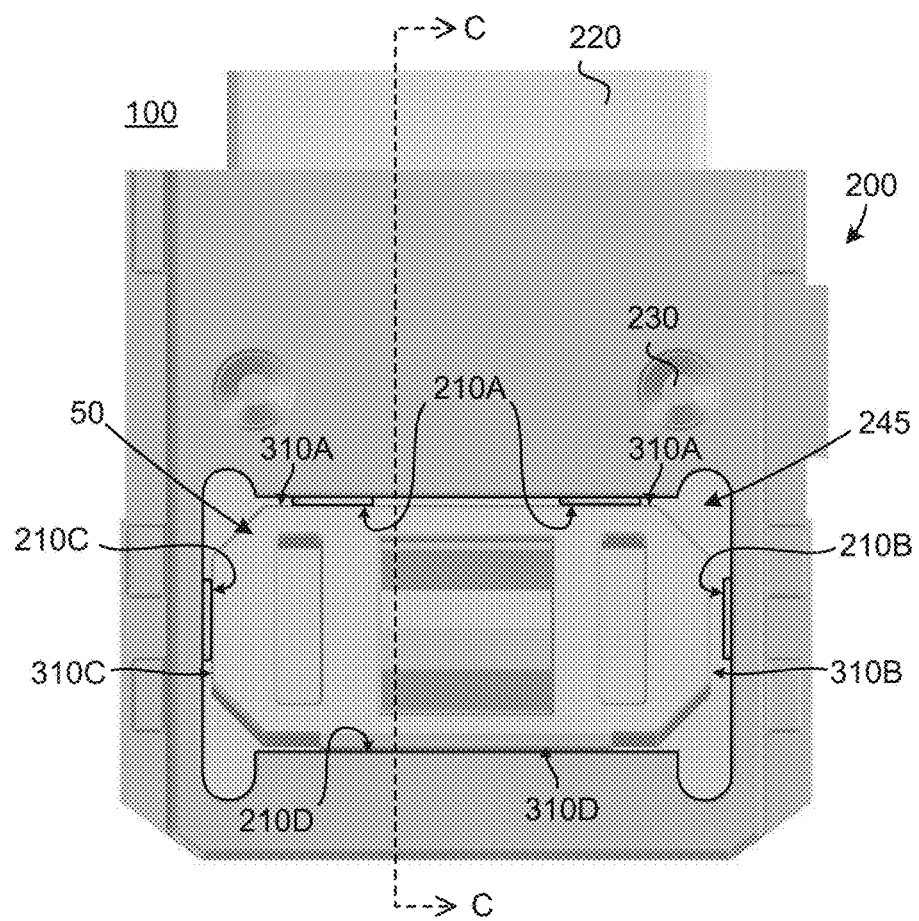
FIG. 4B illustrates a plan view of an example optical connector comprising an example assembly connected to an example ferrule.
Figure 4C:
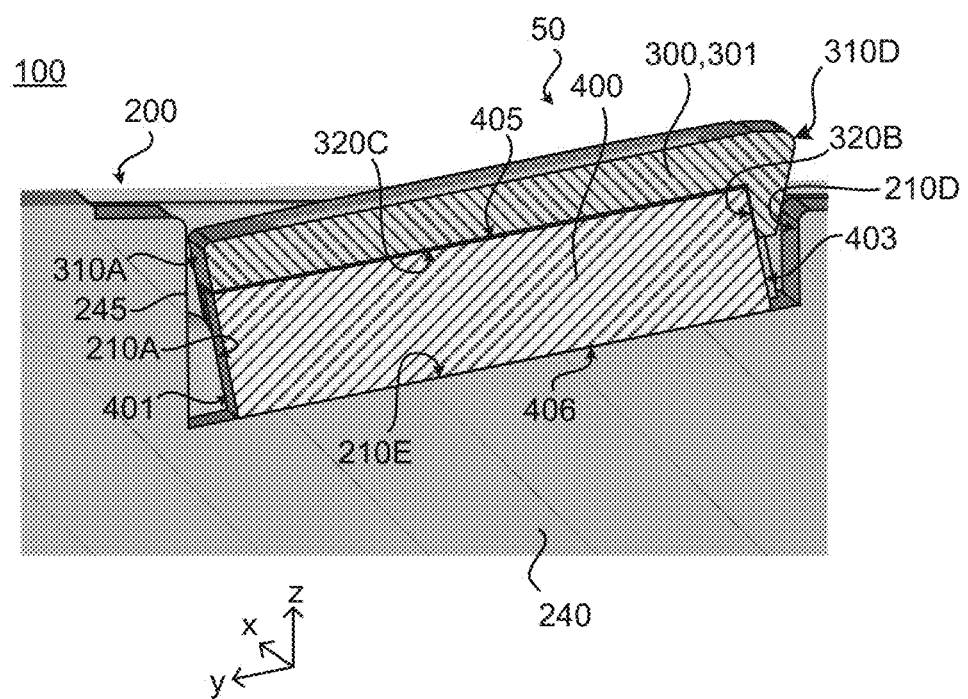
FIG. 4C illustrates a perspective cross-sectional view of the example optical connector, with the cross-section taken along the line C in FIG. 4B.
Figure 5:
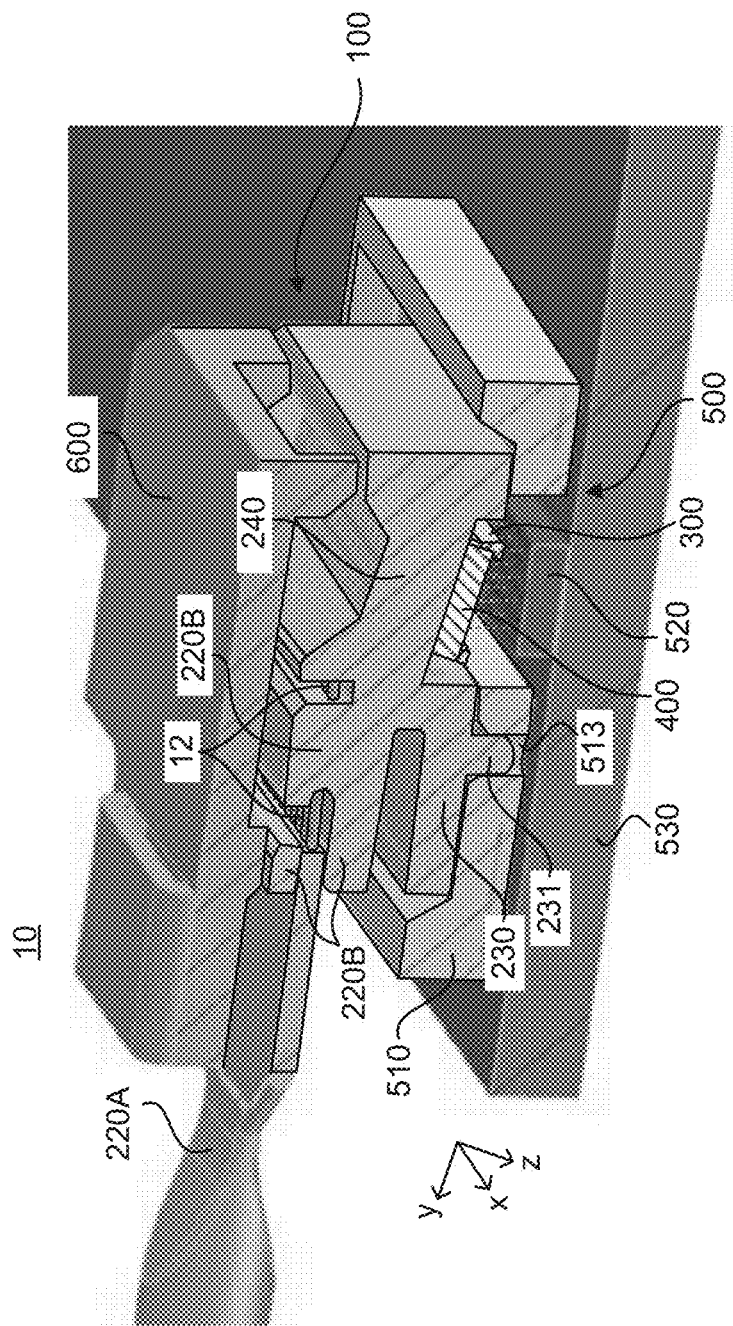
FIG. 5 illustrates a perspective cross-sectional view of an example optical cable comprising an example optical connector, the connector connected to an example optical socket of an example optical interface, with the cross-section taken along the line C in FIG. 4B.
Figure 6:
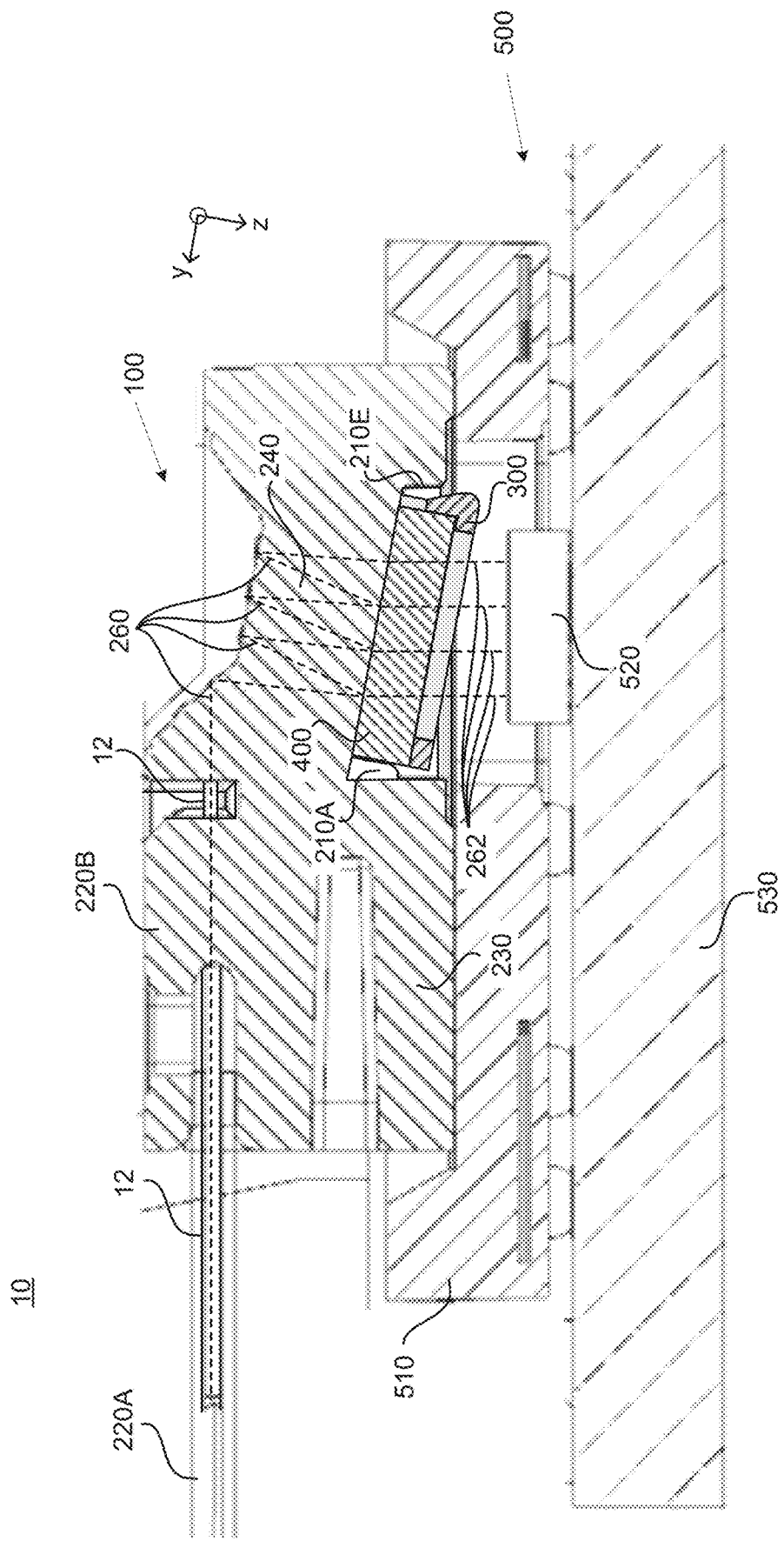
FIG. 6 illustrates a plan cross-sectional view of an example optical cable comprising an example optical connector, the connector connected to an example optical socket of an example optical interface, with the cross-section taken along the line C in FIG. 4B.

FIGS. 4-6 illustrate example optical connectors 100 and/or example optical cables 10. The example optical connectors 100 include the example assembly 50 (which comprises adaptor 300 and optical component 400), and an example ferrule 200, to which the assembly 50 is connected. The example optical cables 10 may include the optical connector 100, as well as optical fibers 12 that are connected to the optical connector 100. FIG. 4A illustrates a perspective view of an example optical connector 100 from a +z side of the adaptor 300, in which the assembly 50 and the ferrule 200 are not yet connected to one another. FIG. 4B illustrates a plan view of an example optical connector 100 from a +z side of the adaptor 300 (i.e., a top down view), in which the assembly 50 and the ferrule 200 are connected to one another. FIG. 4C illustrates a perspective cross-sectional view of the example optical connector 100, with the cross-section taken along the line C in FIG. 4B. FIG. 5 illustrates a perspective cross-sectional view of an optical cable 10 comprising an optical connector 100, the optical connector 100 being connected to an optical socket 510 of an optical interface 500, with the cross-section taken along the line C in FIG. 4B. FIG. 6 illustrates a plan cross-sectional view of an optical cable 10 comprising an optical connector 100, the optical connector 100 being connected to an optical socket 510 of an optical interface 500, with the cross-section taken along the line C in FIG. 4B.

As can be seen in FIGS. 4A-C, the ferrule 200 may include alignment features 210, a cable termination portion 220, an optical socket connection portion 230, and a light guide portion 240 (see FIGS. 4C and 5) The alignment features 210 are to engage with and passively align: (1) an optical component that has the reference size/shape of the ferrule 200 (hereinafter, "reference-sized optical component") (not illustrated), and/or (2) an assembly 50 comprising the adaptor 300 and an optical component 400 that is smaller than the reference size/shape of the ferrule 200. The cable termination portion 220 is to hold terminal ends of optical fibers 12. The optical socket connection portion 230 is to engage with complementary features of an optical socket 510 when the optical connector 100 is connected to the optical socket 510, and to facilitate passive alignment of the optical connector 100 relative to an optical socket 510. The light guide portion 240 is to guide light along optical paths 260 between optical fibers 12 and the optical component 400.

In particular, the alignment features 210 are to engage with side walls of the reference-sized optical component as the reference-sized optical component is being connected to the ferrule 200 so as to passively align the reference-sized optical component relative to the ferrule. In particular, the alignment features 210A-D may, for example, constrain lateral motion of the reference-sized optical component (i.e., motion in a direction in the x-y plane), and the alignment features 210E may constrain motion of the reference-sized optical component in the −z direction. The alignment features 210A-E may also constrain rotation of the reference-sized optical component (e.g., pitch, roll, and yaw). The constraints imposed by the alignment features 210A-E may passively align the reference-sized optical component by forcing it to be in an aligned position relative to the ferrule 200.

The alignment features 210 are also to engage with side walls of the adaptor 300 of the assembly 50 as the assembly 50 is being connected to the ferrule 200 so as to passively align the adaptor 300 relative to the ferrule 200. In particular, the alignment features 210A-D may, for example, constrain lateral motion of the adaptor 300 (i.e., motion in a direction in the x-y plane), and the alignment features 210E may constrain motion of the adaptor 300 in the −z direction. The alignment features 210A-E may also constrain rotation of the adaptor 300 (e.g., pitch, roll, and yaw). The constraints imposed by the alignment features 210A-E may passively align the optical component 400 within the assembly 50 by forcing it to be in an aligned position relative to the ferrule 200.

For example, as illustrated in FIG. 4A, the alignment features 210A-D may be formed as protrusions from interior walls of a recess 245 that is formed in a body of the ferrule 200 adjacent to the light guide portion 240, while the alignment features 210E are formed by a floor of the recess 245. In such examples, surfaces of the protrusions that form the alignment features 210A-D may be to engage with (A) exterior side walls of the reference-sized optical component, or (B) the first alignment features 310A-D, respectively, of the adaptor 300. The alignment feature 210E may be to engage with (A) a bottom wall of the reference-sized optical component, or (B) a bottom surface of the adaptor 300. In such examples, as the reference-sized optical component or assembly 50 is inserted into the recess 245, the alignment features 210A-D passively align the reference-sized optical component or adaptor 300 relative to the ferrule 200. In this context, features "engaging with" one another means the features are arranged to face one another in close proximity so as to constrain one another's motion. Features that are "engaging with" one another may be in contact with one another, but do not necessarily have to be in contact. In particular, there may be some finite tolerance built into the dimensions of the features such that there may be small "gaps" between some corresponding features that are "engaging with" one another—for example, FIG. 4B illustrates such a gap (not to scale) between the alignment features 210B and 310B, which are engaging with one another. In general, such gaps should be smaller than the minimum precision±ε required to ensure proper alignment of the optical signals.

In certain examples, when the optical component 400 of the assembly 50 is in the aligned position relative to the ferrule 200, the reference surface 401 of the optical component 400 is aligned with a surface of the alignment features 210A, as illustrated in FIG. 4C. The reference surface 401 being aligned with the alignment features 210A means that the reference surface 401 and the alignment feature 210A are both flush with (if flat surfaces) or tangent to (if non-flat surfaces) a same plane that is parallel to the x-z plane or the y-z plane. In certain examples, the when the optical component 400 of the assembly 50 is in the aligned position relative to the ferrule 200, the reference surface 401 may be aligned with both the alignment features 210A and the alignment features 310A. For example, see FIG. 4C, which shows the surface 401 of the optical component 400, one of the alignment features 210A, and the first alignment feature 310A all being flush with the same plane. Furthermore, in certain examples, when the optical component 400 of the assembly 50 is in the aligned position relative to the ferrule 200, the bottom surface 406 of the optical component 400 is flush with the alignment feature 210E, as illustrated in FIG. 4C. Furthermore, in certain examples, when the optical component 400 of the assembly 50 is in the aligned position relative to the ferrule 200, the optical component 400 is centered in at least one lateral direction (e.g., the x-direction) relative to: (A) the ferrule 200, (B) the alignment features 210B and 210C of the ferrule, and/or (C) the recess 245 of the ferrule 200.

Although some of the alignment features 210 are illustrated in the Figures as being flat surfaces, this is merely one example and the alignment features 210 could be configured differently. For example, the alignment features 210 may have any shapes that, in conjunction with the first alignment features 310, allow for passive alignment of the adaptor 300. For example, the alignment features 210 may be formed by flat surfaces, curved surfaces, irregular surfaces, etc. In addition, although some of the alignment features 210 are illustrated in the Figures as corresponding to protrusions from interior walls of a recess 245, this is merely one example and the alignment features could be otherwise. For example, the alignment features 210 may be formed by protrusions outward from a non-recessed portion of the body of the ferrule 200, depressions or holes in the body of the ferrule 200, etc. Furthermore, the number of alignment features 210 that are used is not limited to that shown in the example.

The example optical connector 100 may be formed by connecting a reference-sized optical component 4000 or the assembly 50 to the ferrule 200. The reference-sized optical component 4000 or the assembly 50 may be connected to the ferrule 200 by, for example, inserting the component 4000 or assembly 50 into the recess 245, and then applying mechanical or chemical fasteners to affix the component 4000 or assembly 50 to the ferrule 200. For example, adhesive may be applied in the recess 245 to affix the component 4000 or assembly 50 to the ferrule.

As noted above, an optical cable 10 comprises an optical connector 100 together with optical fibers 12. In certain examples, the same number of optical fibers 12 may be included in the optical cable 10 regardless of how many active lanes the optical cable 10 is intended to have. A maximum number of lanes that the optical cable 10 may use may be limited by the number of optical fibers 12 that are included in the cable 10, but an optical cable 10 that is intended to use fewer lanes than the maximum number may be formed by simply using less than all of the included optical fibers 12 during communications. The optical fibers 12 that are to be available for use in communication may be referred to herein as the "active" optical fibers 12. For example, the optical component 400 that is included in the optical connector 100 of the optical cable 10 may be sized to accommodate optical signals from only a certain number of optical fibers 12 (the active fibers 12), and optical signals to/from the non-active optical fibers 12 are not passed by the optical component 400 because they simply do not impinge thereon. Thus, for example, a 16× optical cable 10, an 8× optical cable, and a 4× optical cable may all include, for example, sixteen optical fibers 12 each, but less than all of the optical fibers 12 may be active in the 8× and 4× optical cables 10. Including the same number of optical fibers 12 in multiple optical cables 10 regardless of the lane designation of the optical cables 10 may reduce the cost of the cables 10, as this may simplify the manufacturing process and enable the same ferrules 200 to be used for all of the cables 10 (also, the optical fibers 12 may represent a small portion of the total cost of the cables 10).

The optical fibers 12 may be terminated in a cable termination portion 220 of the ferrule 200. For example, as illustrated in FIGS. 5 and 6, the cable termination portion 220 of the ferrule 200 may receive the terminal ends of the optical fibers 12, fan the optical fibers 12 out, and hold the optical fibers 12 in fixed positions such that the optical signals emitted from the optical fibers 12 travel along the optical paths 260 through the light guide portion 240 (and, conversely, optical signals traveling along the optical paths 260 are received by the optical fibers 12). In certain examples, the cable termination portion 220 may include two parts; for example, a first part 220A may be distinct from the body forming the light guide portion 240 of the ferrule 200, while a second part 220B may be part of the same body that forms the light guide portion 240. For example, the part 220A may fan out the optical fibers 12 and hold them in the fanned out arrangement, while the part 220B may hold the part 220A and guide the optical fibers 12 into positions that will allow them to optically couple with the optical paths 260.

As noted above, the optical socket connection portion 230 includes features that are to engage with complementary features of an optical socket 510 when the optical connector 100 is connected to the optical socket 510, and to facilitate passive alignment of the optical connector 100 relative to an optical socket 510. For example, as illustrated in FIGS. 4A-6, the optical socket connection portion 230 may include alignment features 231 that are protrusions from the bottom of the optical socket connection portion 230. As seen in FIG. 5, the alignment features 231 may mate with complementary alignment features 513 of the optical socket so as to ensure that the optical connector 100 is aligned relative to the optical socket 510.

In the examples illustrated in the Figures, the optical component 400 that is included in the example optical connector 100 may be a multi-wavelength spectral filter that may include different wavelength regions 405A-405D that each are to pass a different wavelength range and reflect other wavelengths. As noted above, the optical component 400, in combination with the ferrule 200, may form a CWDM Mux/Demux. In CWDM communications, multiple discrete optical signals with distinct wavelengths (or wavelength ranges) are combined by an optical mux into an aggregate optical signal that may be carried on a single optical fiber, and an aggregate optical signal may be separated by an optical demux into multiple discrete optical signals with distinct wavelengths (or wavelength ranges). In the example illustrated in the Figures, the optical mux and optical demux are combined together in the CWDM Mux/Demux formed by the optical component 400 and the ferrule 200.

In particular, as illustrated in FIG. 6, the ferrule 200 may be configured to receive optical signals output by the terminal ends of optical fibers 12 that are connected thereto, and guide the optical signals along optical paths 260 through the ferrule 200 so that they impinge on the wavelength regions 405A-D of the optical component 400. The optical signals impinging on the optical component 400 may be split by the optical component 400 into multiple signals (each of a different wavelength), which propagate toward the active optical devices 520 along optical paths 262, which pass through the optical component 400 and the space between the active optical devices 520 and the optical component 400.

As illustrated in FIG. 6, the optical paths 260 through the ferrule 200 may include multiple reflections between the optical component 400 and portions of the ferrule 200 so as to allow the optical paths 260 to impinge on each of the wavelength regions 405A-D. At each of the wavelength regions 405A-D, a portion of the optical signals will be passed through the optical component (propagating along one of the optical paths 262) and a portion will be reflected back into the ferrule 200 (propagating further along the path 260) so as to impinge on a next one of the wavelength regions 405A-D. For example, the optical signals from the optical fibers 12 may be guided so as to first impinge on the first wavelength region 405A, whereupon the portions of the optical signals with the correct wavelengths will pass through the first wavelength region 405A and the remaining wavelengths of the optical signals will be reflected by the first wavelength region 405A. The optical signals reflected from the first wavelength region 405A will then be guided by the ferrule 200 so as to impinge on the next wavelength region 405B, and so on until the optical signals have impinged on all of the wavelength regions 405A-D.

Conversely, optical signals that are generated by the active optical devices 520 for transmission along the optical fibers propagate upward along optical paths 262, are received by the optical component 400, and are passed through the optical component 400 into the ferrule 200. Each signal received from the active optical devices 520 by the optical component 400 is received at a corresponding one of the wavelength regions 405A-D, and each of the optical signals is able to pass through the associated filter and into the ferrule 200 because it has the wavelength passed by the filter. Once the optical signal is passed into the ferrule 200, it propagates toward the fibers 12 along the optical paths 260, being reflected back and forth by the ferrule 200 and the optical component 400 until it is ultimately guided by the ferrule 200 into the optical fibers 12.

Although a single signal path 260 is illustrated in FIG. 6 for simplicity, in practice each optical fiber 12 may have its own associated signal path 260 along which optical signals to/from that optical fiber 12 will travel. Each signal path 260 may be associated with N signal paths 262, where N is the number of wavelength regions of the optical component 400 (i.e., the number of discrete wavelengths that are multiplexed in each optical fiber 12). Thus, in the example illustrated in the Figures in which there are four wavelength regions 405A-D (i.e., N=4), each signal path 260 is associated with four signal paths 262.

The example optical interface 500 may include a number of optical sockets 510, a PCB 530, and a number of active optical devices 520 for each optical socket 510. The optical sockets 510 and the active optical devices 520 may be connected to the PCB 530 (see FIGS. 5 and 6). In the Figures, one optical socket 510 is illustrated for simplicity, but multiple optical sockets 510 may be included in the optical interface 500.

The active optical devices 520 may include one or more devices that are to generate optical signals (e.g., lasers, LEDs, OLEDs, etc.) and/or one or more devices that are to receive optical signals (e.g., photodiodes, etc.). Those active optical devices 520 that are to generate optical signals may each have an optical axis that corresponds to a propagation path for optical signals emitted from the center of the respective active optical device 350. Those active optical devices 520 that are to receive optical signals may each have a light receiving region that is to receive optical signals from the connector 500. The light receiving regions of the active optical devices 520 may either convert the received optical signals into electrical signals or may transfer the optical signals to some other portion of the device that converts the optical signals into electrical signals; for example, the light receiving regions may be photodiodes, lenses, mirrors, or other optical components.

The optical socket 510 may include a body, which may have a top face and a recessed face that is recessed from the top face, thereby forming a depression in which the ferrule 200 may be inserted when the ferrule 200 is connected to the optical socket 510. The recessed face may contact a bottom face of the ferrule 200 when the ferrule 200 is mated to the optical socket 510. The body may include angled guide walls between the top face and the recessed face that may help to guide the ferule 200 into position to mate with the optical socket 510 as a user pushes the ferrule 200 downward. The body may also include a window over and/or around the active optical devices 520, through which optical signals may be communicated. The optical socket 510 may also include alignment features 513 on or in the body that are to engage with the complimentary alignment features 231 of the ferrule 200 so as to passively align the ferrule 200 relative to the optical socket 510 as the ferrule 200 is connected to the optical socket 510. For example, the alignment features 513 illustrated in FIG. 5 comprise holes in the recessed face that are to receive the protrusions that form the alignment features 231 of the ferrule 200.

In FIG. 5, the alignment features 513 are illustrated as two depressions that are roughly cylindrical in shape, which are to engage with two complementary alignment features 231 of the ferrule 200, which are illustrated as two protrusions that are roughly cylindrical in shape. However, this is merely one possible example, and the alignment features 513/231 could have configurations other than those illustrated. For example, the alignment features 513 could be protrusions rather than depressions, in which case the complementary alignment features 231 of the ferrule 200 may be complementary depressions. As another example, the alignment features 513 could include both protrusions and depressions, in which case the complementary alignment features 231 of the ferrule 200 may also include both protrusions and depressions. As another example, the alignment features 513/231 (whether depressions or protrusions) could have any shape, such as cuboids, pyramids, prisms, parallelepipeds, etc. As another example, there could be as few as one alignment feature 513/231, or more than two alignment features 513/231.

The optical socket 510 may be precisely aligned relative to the active optical devices 520, such that when the optical connector 100 is mated to the optical socket 510 and properly aligned relative to the optical socket 510, then each of the optical paths 262 is aligned with the optical axis and/or light receiving region of corresponding active optical devices 520. Thus, when the optical connector 100 is mated to the optical socket 510 and properly aligned, optical signals emitted from the active optical devices 520 propagate toward the optical component 400 along the optical paths 262, allowing the optical signals to ultimately be received by the optical fibers 12. Furthermore, when the optical connector 100 is mated to the optical socket 510 and properly aligned, optical signals emitted from the optical component 400 propagate toward the active optical devices 520 along the optical paths 262, allowing the optical signals to ultimately be received by the light receiving regions of the corresponding active optical devices 520. Thus, when the optical connector 100 is mated to the optical socket 510 and properly aligned, communication of optical signals between the optical fibers 12 and the active optical devices 520 is enabled.

In certain examples, the optical interface 500 and/or the connector 100 may include additional components beyond those described above. For example, FIG. 5 illustrates an example removable latch 600 that may be used to keep the connector 100 from unintentionally disconnecting from the optical socket 510. As another example, in certain examples an integrated circuit (not illustrated) for processing communications that are sent/received via the optical interface 500 may be included on the PCB 530—for example, the optical interface 500 may be an optical transceiver module. In certain examples, multiple optical sockets 510 may be included on the same PCB 530, each with their own number of active optical devices 520.

[Example Methods]

Figure 7:
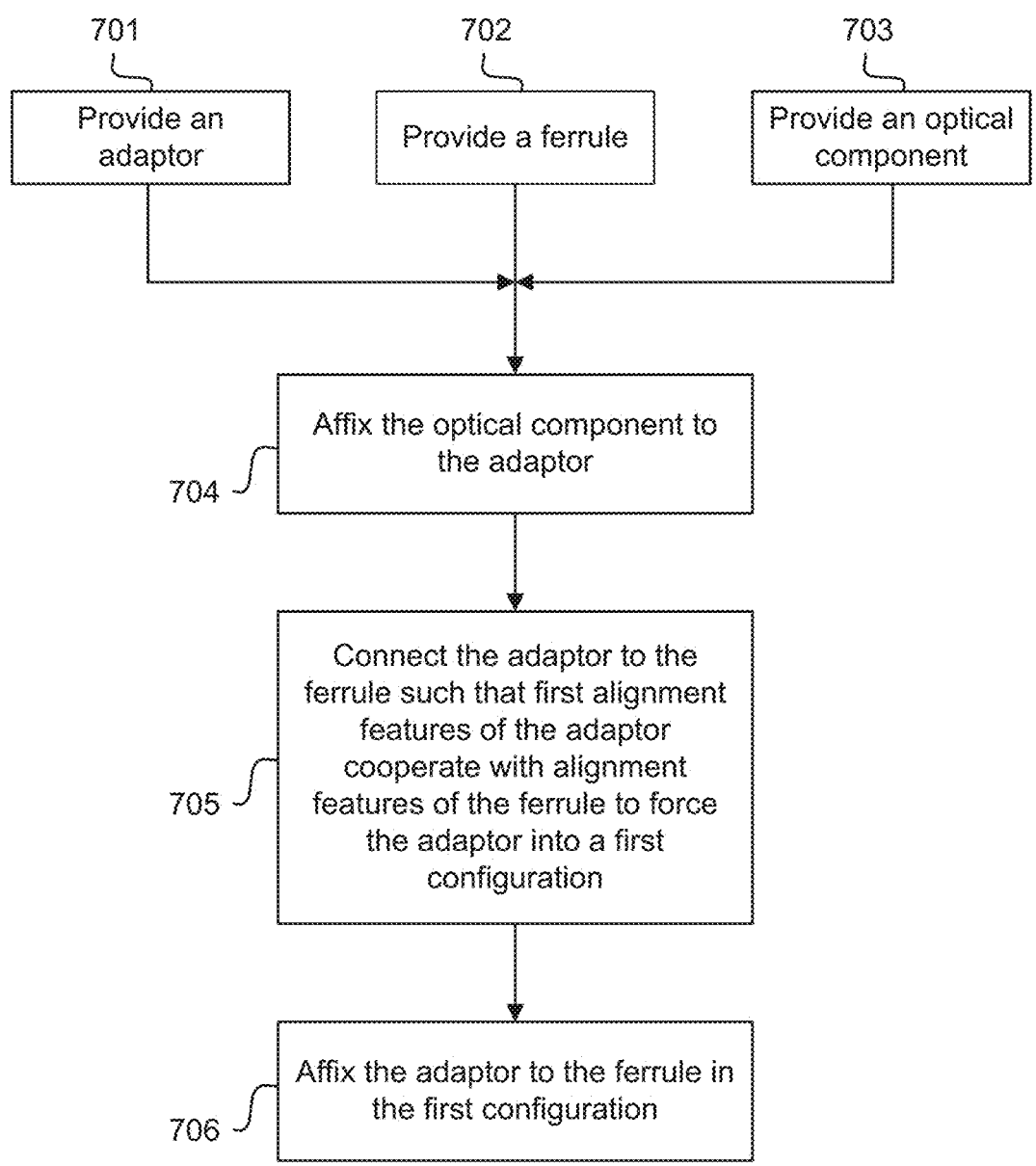
FIG. 7 is a process flow chart illustrating an example method of manufacturing an optical connector and/or optical cable.

FIG. 7 illustrates an example method of manufacturing an optical connector and/or an optical cable.

In block 701, an adaptor is provided. The adaptor may be for passively aligning an optical component of an optical connector with a ferrule of the optical connector. The adaptor may include first alignment features that are to, when the adaptor is connected to the ferrule, cooperate with alignment features of the ferrule to passively force the adaptor into a first configuration relative to the ferrule. The adaptor may also include second alignment features arranged such that, when the optical component is held in contact with the second alignment features and the adaptor is in the first configuration, the optical component is aligned relative to the ferrule. For example, the adaptor provided in block 701 may be the example adaptor 300 described above.

In block 702 a ferrule may be provided. The ferrule may include alignment features that are to cooperate with the first alignment features of the adaptor to passively force the adaptor into a first configuration relative to the ferrule. For example, the ferrule provided in block 702 may be the example ferrule 200 described above.

In block 703 an optical component is provided. The optical component is to be interposed in the optical paths of the ferrule and may perform some desired operation on the optical signals, such as filtering, focusing, reflecting, etc. For example, the optical component may be a filter, a lens, a micro-lens array, a polarizer, a prism, a beamsplitter, etc. For example, the optical component provided in block 703 may be the example optical component 400 described above.

In block 704, the optical component is affixed to the adaptor. For example, the optical component may be affixed to the adaptor such that the optical component is held in contact with the second alignment features of the adaptor. For example, the optical component may be placed in proximity the second alignment features, then a force may be applied to the optical component to push it into contact with the second alignment features, and then a fastener (such as, for example, adhesive) may be applied to the optical component and/or adaptor to affix the optical component in the position in which it is in contact with the second alignment features.

In block 705 an assembly comprising the adaptor with the affixed optical component is connected to the ferrule such that the first alignment features of the adaptor cooperate with the alignment features of the ferrule to passively force the adaptor into the first configuration relative to the ferrule. In certain examples, the first configuration corresponds to the position of the adaptor that causes the optical component to be aligned relative to the ferrule.

In block 706, the adaptor is affixed to the ferrule in the first configuration. For example, a fastener (such as, for example, adhesive) may be applied to the adaptor and/or ferrule.

Figure 8:
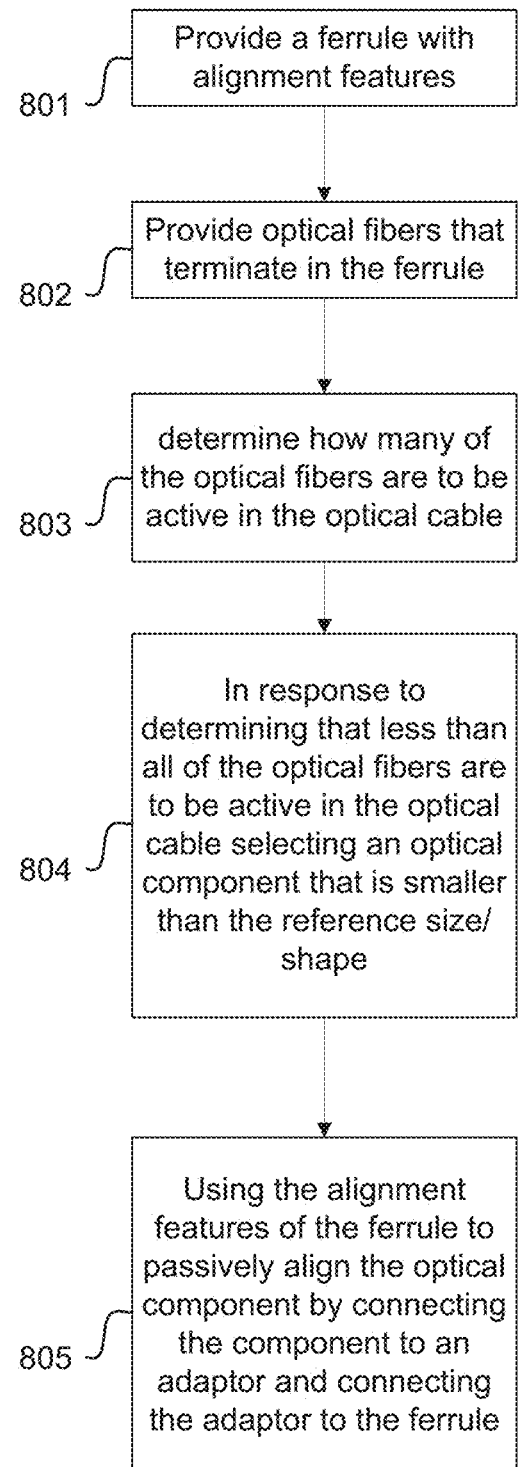
FIG. 8 is a process flow chart illustrating another example method of manufacturing an optical connector and/or optical cable.

FIG. 8 illustrates another method of manufacturing an optical cable.

In block 801, a ferrule with alignment features is provided. The alignment features of the ferrule may be configured to passively align a reference-sized optical component. For example, the ferrule provided in block 801 may be the example ferrule 200 described above.

In block 802, optical fibers are provided that terminate in the ferrule (for example, the optical fibers 12).

In block 803, it is determined how many of the optical fibers are to be active in the optical cable. This determination need not necessarily be an identification of the exact number of active fibers, but rather may be any type of quantitative determination. For example, the determination may be made by determining whether all or less-than-all of the fibers are to be used. As another example, the determination may be made with reference to something that is related to the number of active optical fibers, such as the number of active lanes the optical cable is supposed to have. For example, if a 16× optical cable would use all of the optical fibers and the optical cable being manufactured is an 8× optical cable, then it would be determined that less than all of the optical fibers are to be active in the optical cable being manufactured.

In block 804, in response to determining that less than all of the optical fibers are to be active, an optical component that is smaller than the reference-sized optical component is selected. For example, if the reference-sized optical component is a 16× component and the optical cable being manufactured is an 8× optical cable, then in block 804 an 8× optical component may be selected. If all of the optical fibers were to be used, then the reference-sized optical component could be used without the adaptor.

In block 805 the alignment features of the ferrule are used to passively align the selected optical component relative to the ferrule by connecting the selected optical component to an adaptor and connecting the adaptor to the ferrule. For example, while connecting the adaptor to the ferrule, the selected optical component passively aligned relative to the ferrule by engaging first alignment features of the adaptor with the alignment features of the ferrule. The selected optical component may be affixed to the adaptor prior to connecting the adaptor to the ferrule, such that the selected optical component is in contact with second alignment features of the adaptor. Upon being connected, the adaptor may be affixed to the ferrule, for example by applying adhesive.

In certain examples, the method of FIG. 8 may further include changing a number of active lanes that the optical cable may use by: removing the adaptor and optical component from the ferrule; and connecting a second optical component to the ferrule, where the second optical component has a different size than the optical component. For example, an 8× optical cable may be converted into a 16× optical cable by removing the 8× optical component and inserting a 16× optical component (whether or not an adaptor will be needed for the 16× optical component will depend on what the reference size/shape is for the ferrule). Thus, multiple different types of optical cables (e.g., 4×, 8×, 16×, etc.) may be manufactured using a single size of ferrule.

As used herein, "lateral" refers to directions that are parallel to the x-y plane illustrated in the Figures.

As used herein, the "aligned position" of the optical component 400 relative to the adaptor 300 and the "aligned position" of the adaptor 300 relative to the ferrule 200, are defined to be those positions of the optical component 400 relative to adaptor 300 and the adaptor relative to ferrule 200 for which it is the case that the optical component 400 would be in an aligned position relative to the ferrule 200. In this context, the optical component 400 is in the "aligned position" relative to the ferrule 200 when each of the active optical paths 260 from optical fibers 12 connected to the ferrule 200 would impinge on the optical component 400 and then propagate from the optical component 400 along the desired optical paths 262. The desired optical paths 262 for the optical component 400 may be defined, for example, by the configuration of the ferrule 220 and the optical interface 500 that it is designed to connect to. For example, the desired optical paths 262 may be the paths that align with optical axis and/or light receiving regions of corresponding active optical devices 520. Thus, in certain examples, the optical component 400 is in the "aligned position" relative to the ferrule 200 when optical signals can be successfully communicated between the optical fibers 12 and the active optical devices 520 via the optical component 400. In certain examples, the desired optical paths 262 for the component 400 may be defined as a subset of the optical paths 262 that would result if the reference size/shaped optical component 4000 were used in the ferrule 200 instead of the assembly 50. In certain examples, the "aligned position" of the optical component 400 relative to the adaptor 300 is the position at which the optical component 400 is centered relative to the adaptor 300 in the x and/or y directions. In certain examples, the "aligned position" of the adaptor 300 relative to the ferrule is the position at which the adaptor 300 is centered relative to the recess 245 of the ferrule 200 in the x and/or y directions. In this context, the "active" optical paths 260 from the optical fibers 12 comprise those optical paths that the connector 100 is designed to use; thus, for example, the "active" optical paths 260 of an 8× connector 100 would comprise those optical paths 260 associated with the eight active lanes of the connector 100, but not those associated with inactive lanes. Note that all references herein to "aligned", "alignment", and the like should be understood to not require exact precision (which is not possible), but rather to allow for deviations from theoretically perfect alignment up to some tolerance level. In certain examples, the tolerance level may be within 10 µm. In other examples, such as in demanding single mode applications, the tolerance level may be within 1 µm. In other examples, such as in certain multi-mode applications, the tolerance level may be within 25 µm.

As used herein, to "provide" an item means to have possession of and/or control over the item. This may include, for example, forming (or assembly) some or all of the item from its constituent materials and/or, obtaining possession of and/or control over an already-formed item.

Throughout the description, directions are described with reference to an x-y-z reference frame, which is illustrated in the Figures. This x-y-z reference frame is fixed relative to the adaptor 300. The reference frame is not intended to show absolute position (the location of the reference frame relative to the adaptor 300 changes throughout the Figures), but instead the reference frame is intended to generally show directions of extension. Specifically, the +z direction is defined to point away from the ferrule 200 when the adaptor 300 is connected thereto; furthermore, the +z direction points towards the PCB 530 when the adaptor 300 is included in an optical connector 100 that is connected to an optical interface 500. The +z direction may be perpendicular to a surface of the adaptor 300. The x- and y-directions are mutually perpendicular to each other and to the +z direction. The x- and y-direction may further corresponding to lateral dimensions of the adaptor 300. For example, the x-direction may correspond to a direction of extent for a longest dimension (length) of the adaptor.

Herein the word "position" may refer to both of a location and an orientation (i.e., pitch, roll, yaw) of an object. Occasionally the word "configuration" will be used with the same meaning. Thus, for example, the "aligned position" of the optical component relative to the ferrule may refer to both the location and orientation of the optical component relative to the ferrule.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of active optical devices, wherein the active optical devices . . . " could encompass both one active optical device and multiple active optical devices, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one item is being referred to. Thus, for example, a phrase such as "an optical socket, wherein the optical socket . . . " could encompass both one optical socket and multiple optical sockets, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., in parallel).

While the above disclosure has been shown and described with reference to the foregoing examples, it should be understood that other forms, details, and implementations may be made without departing from the spirit and scope of this disclosure.

What is claimed is:

1. An optical assembly comprising:
a ferrule;
an optical component;
an adaptor for passively aligning the optical component with the ferrule, the adaptor comprising a body that is to be inserted into a recess of the ferrule so as to hold the optical component in an aligned position relative to the ferrule, the recess of the ferrule being configured to hold a reference-sized optical component, the optical component being smaller than the reference-sized optical component;
the body of the adaptor comprising:
first alignment features that are to, when the adaptor is connected into the recess of the ferrule, cooperate with alignment features of the ferrule to passively force the adaptor into a first configuration relative to the ferrule; and
second alignment features arranged such that, when the optical component is held in contact with the second alignment features and the adaptor is in the first configuration relative to the ferrule, the optical component is in the aligned position relative to the ferrule, the second alignment features comprising first, second, and third surfaces defining a recess in the body of the adaptor to receive the optical component therein, the first, second, and third surfaces extending parallel to three different respective planes.

2. The optical assembly of claim 1,
wherein the second alignment features are such that, when the optical component is held in contact with the second alignment features, a reference surface of the optical component is aligned with one of the first alignment features.

3. The optical assembly of claim 1,
wherein, when the optical component is in the aligned position relative to the ferrule, the optical component is centered in a first lateral direction relative to the ferrule.

4. The optical assembly of claim 1, further including:
a cavity in one of the second alignment features arranged such that adhesive is capable of being inserted therein while the optical component is in contact with the first alignment features.

5. The optical assembly of claim 1,
wherein the optical component is a coarse wave division multiplexing spectral filter.

6. The optical assembly of claim 1,
wherein the first alignment features have the same lateral dimensions as a reference-sized optical component of the ferrule.

7. The optical assembly of claim 1, wherein the optical component is affixed to the adaptor such that the optical component is held in contact with the second alignment features of the adaptor.

8. The optical assembly of claim 7,
wherein a reference surface of the optical component is aligned with one of the first alignment features of the adaptor.

9. The optical assembly of claim 7,
wherein one of the second alignment features includes a cavity in which adhesive is disposed, the adhesive affixing the second alignment feature to a surface of the optical component.

10. The optical assembly of claim 7,
wherein the adaptor is connected to the ferrule in the first configuration and affixed to the ferrule, and
the optical component is in the aligned position relative to the ferrule.

11. The optical assembly of claim 10,
wherein the alignment features of the ferrule are such that, if a reference-sized optical component were connected to the ferrule instead of the assembly, the alignment features of the ferrule would cooperate with side walls of the reference-sized optical component to passively align the reference-sized optical component relative to the ferrule.

12. An optical assembly comprising:
a ferrule to connect to an optical interconnect of an electronic device, the ferrule including a recess that is configured to hold a reference-sized optical component and alignment features that are configured to passively align the reference sized optical component relative to the ferrule when the reference sized optical component is inserted in the recess;
an adaptor that is affixed to the ferrule in the recess, the adaptor including first alignment features and second alignment features;
an optical component that is affixed to the adaptor, the optical component being smaller than the reference-sized optical component;
wherein the first alignment features cooperate with the alignment features of the ferrule to at least partially constrain a position of the adaptor relative to the ferrule, and
the second alignment features contact the optical component and at least partially constrain a position of the optical component relative to the adaptor, the second alignment features comprising first, second, and third surfaces defining a recess in the body of the adaptor to receive the optical component therein, the first, second, and third surfaces extending parallel to three different respective planes, and
the optical component is in an aligned position relative to the ferrule.

13. The optical assembly of claim 12, further comprising:
optical fibers that are terminated in the ferrule;
wherein the optical component is sized to communicate, via the ferrule, with less than all of the optical fibers.

14. The optical assembly of claim 12,
wherein a lateral reference surface of the optical component is aligned with one of the first alignment features of the adaptor and with one of the alignment features of the ferrule.

15. The optical assembly of claim 12,
wherein the ferrule comprises a recess, the alignment features of the ferrule are arranged within the recess, and the adaptor and optical component are at least partially disposed in the recess.

16. The optical assembly of claim 15,
wherein the optical component is centered in a first lateral direction within the recess.

* * * * *